United States Patent
Zhang et al.

(10) Patent No.: US 10,932,195 B1
(45) Date of Patent: Feb. 23, 2021

(54) PARENT DEVICE SHADOW EXECUTION FOR A SLEEPING LOW POWER AND LOSSY NETWORK CHILD NETWORK DEVICE

(71) Applicant: Cisco Technology, Inc., San Jose, CA (US)

(72) Inventors: Lele Zhang, Shanghai (CN); Ling Wei, Shanghai (CN); Xi Wu, Shaghai (CN); Tonglin Yuan, Shaghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/574,295

(22) Filed: Sep. 18, 2019

(51) Int. Cl.
*H04W 8/00* (2009.01)
*H04W 52/02* (2009.01)
*H04W 84/18* (2009.01)
*H04W 40/24* (2009.01)

(52) U.S. Cl.
CPC ....... *H04W 52/0235* (2013.01); *H04W 8/005* (2013.01); *H04W 40/246* (2013.01); *H04W 40/248* (2013.01); *H04W 84/18* (2013.01)

(58) Field of Classification Search
CPC .................................................. H04W 8/005
See application file for complete search history.

(56) References Cited

U.S. PATENT DOCUMENTS

| | | |
|---|---|---|
| 8,341,279 B2 | 12/2012 | Thubert et al. |
| 9,232,433 B2 | 1/2016 | Subramanian et al. |
| 9,418,340 B2 | 8/2016 | Vasseur et al. |
| 9,606,817 B1 | 3/2017 | Efstathopoulos |
| 10,122,604 B2 | 11/2018 | Byers et al. |
| 2014/0136952 A1 | 5/2014 | Zhu et al. |
| 2018/0294983 A1* | 10/2018 | Mani ................... H04L 63/0884 |
| 2019/0014117 A1 | 1/2019 | Li et al. |
| 2019/0109725 A1 | 4/2019 | Duraisingh |
| 2019/0149629 A1 | 5/2019 | Wetterwald et al. |

(Continued)

OTHER PUBLICATIONS

AWS Documentation, "Device Shadow Service for AWS IoT", [online], 2019, [retrieved on May 31, 2019]. Retrieved from the Internet: URL: <https://docs.aws.amazon.com/iot/latest/developerguide/iot-device-shadows.html>, 1 page.

(Continued)

*Primary Examiner* — Sulaiman Nooristany
(74) *Attorney, Agent, or Firm* — Leon R. Turkevich

(57) ABSTRACT

In one embodiment, a method comprises: generating and storing, by a parent device in a low power lossy network (LLN), first state variables associated with a first execution state of an attached child during an active state of the child; determining a request, received by the parent device, is destined for the child and specifying a second execution state to be executed by the child; selectively updating, by the parent device, the first state variables with second state variables associated with the second execution state identifying an updated execution state for the child; detecting, by the parent device, that the child has transitioned from a sleep state to a second active state, and in response generating an instruction based on the second state variables; and transmitting the instruction to the child during the second active state, causing the child to execute the second execution state.

20 Claims, 5 Drawing Sheets

(56) References Cited

U.S. PATENT DOCUMENTS

2019/0158353 A1 5/2019 Johnson et al.

OTHER PUBLICATIONS

AWS Documentation, "Device Shadow Service Documents", [online], 2019, [retrieved on May 31, 2019]. Retrieved from the Internet: URL: <https://docs.aws.amazon.com/iot/latest/developerguide/device-shadow-document.html>, pp. 1-5.

Cisco, "Cisco Connected Grid WPAN Module for CGR 1000 Series Installation and CG-Mesh Configuration Guide", [online], Jun. 2017, [retrieved on May 10, 2019]. Retrieved from the Internet: URL: <https://www.cisco.com/c/en/us/td/docs/routers/connectedgrid/modules/wpan/release_5-0/Cisco_Connected_Grid_WPAN_Module_for_CGR_1000_Series_Installation_and_CG-Mesh_Configuration_Guide.pdf>, pp. 1-52.

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/FAN/2-0/CU-FAN-2-DIG.pdf>, 182 pages.

Heile et al., "Wi-SUN FAN Overview", [online], Ipwan Internet Draft, Jul. 3, 2017, [retrieved on Aug. 20, 2019]. Retrieved from the Internet: URL: <https://tools.ietf.org/pdf/draft-heile-Ipwan-wisun-overview-00.pdf>, pp. 1-15.

Wikipedia, "IEEE 802.15.4", [online], May 21, 2019, [retrieved on Aug. 20, 2019]. Retrieved from the Internet: URL: <https://en.wikipedia.org/w/index.php?title=IEEE_802.15.4&printable=yes>, pp. 1-7.

"Device Shadow JSON format", [online], Nov. 13, 2018, [retrieved on Aug. 15, 2019]. Retrieved from the Internet: URL: <https://www.alibabacloud.com/help/doc-detail/53932.htm?spm=a2c63.p38356.b99.83.3ed15b5fEv4XKX>, pp. 1-7.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Wikipedia, "Digital twin", [online], May 28, 2019, [retrieved on May 31, 2019]. Retrieved from the Internet: URL: <https://en.wikipedia.org/w/index.php?title=Digital_twin&printable=yes>, pp. 1-14.

Zhang et al., "High Efficiency Sleep Schedule for Battery Based Endpoints in Low-Power and Lossy Networks", [online], Oct. 16, 2018, [retrieved on May 31, 2019]. Retrieved from the Internet: URL: <https://www.tdcommons.org/cgi/viewcontent.cgi?article=2660&context=dpubs_series>, pp. 1-8.

\* cited by examiner

PARENT DEVICE SHADOW EXECUTION FOR A SLEEPING LOW POWER AND LOSSY NETWORK CHILD NETWORK DEVICE

TECHNICAL FIELD

The present disclosure generally relates to a parent device shadow execution for a sleeping low power and lossy network (LLN) child network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"), and/or Wireless Smart Utilities Network (Wi-SUN) according to the example IETF Internet Draft by Heile et al., "Wi-SUN FAN Overview" (draft-heile-lpwan-wisun-overview-00). Such large-scale wireless mesh networks (also referred to as field area networks (FANs)) can be used for deployment of, for example, a connected grid mesh (CG-mesh) network advanced metering infrastructure (AMI). The CG-mesh network can include hundreds or thousands of IEEE 802.15.4e/g based resource-constrained (e.g., low-power) network devices (also referred to herein as Low Power and Lossy Network (LLN) devices), where each LLN device can reach, within its transmission range, hundreds of neighboring network devices.

The Low-power and Lossy Network (LLN) can include dozens or thousands of low-power network devices: in some cases the LLN can be limited to a wireless mesh network; the LLN devices also can be configured for routing data packets according to a routing protocol designed for such low power and lossy networks (RPL). The low-power devices, also referred to as "constrained devices" can be constrained by processing power, memory, and energy (e.g., battery power), and therefore may require substantially-long sleep states ("standby" states) in between with relatively-short active states for execution of different execution states. Further, noise and/or interference on a wireless RF channel can affect communications between LLN devices, resulting in unreliable data links that can be constrained by high loss rates, low data rates, and instability with relatively low packet delivery rates in the LLN.

A problem is that a centralized controller for the FAN (e.g., a centralized AMI controller) may be executed in a "cloud-based" deployment in a data center, where the cloud-based controller issues instructions to each of the LLN devices, as required for operations in the LLN, via the data center, a wide area network, a border router of the LLN, and a parent device of the LLN device in the LLN. However, the cloud-based controller may not be aware of the corresponding sleep schedule of the LLN device, such that the cloud-based controller may send an instruction while the LLN device is asleep; hence, the sleeping LLN device may not receive an instruction from the centralized controller, requiring multiple attempts by the centralized controller that waste bandwidth in the LLN.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
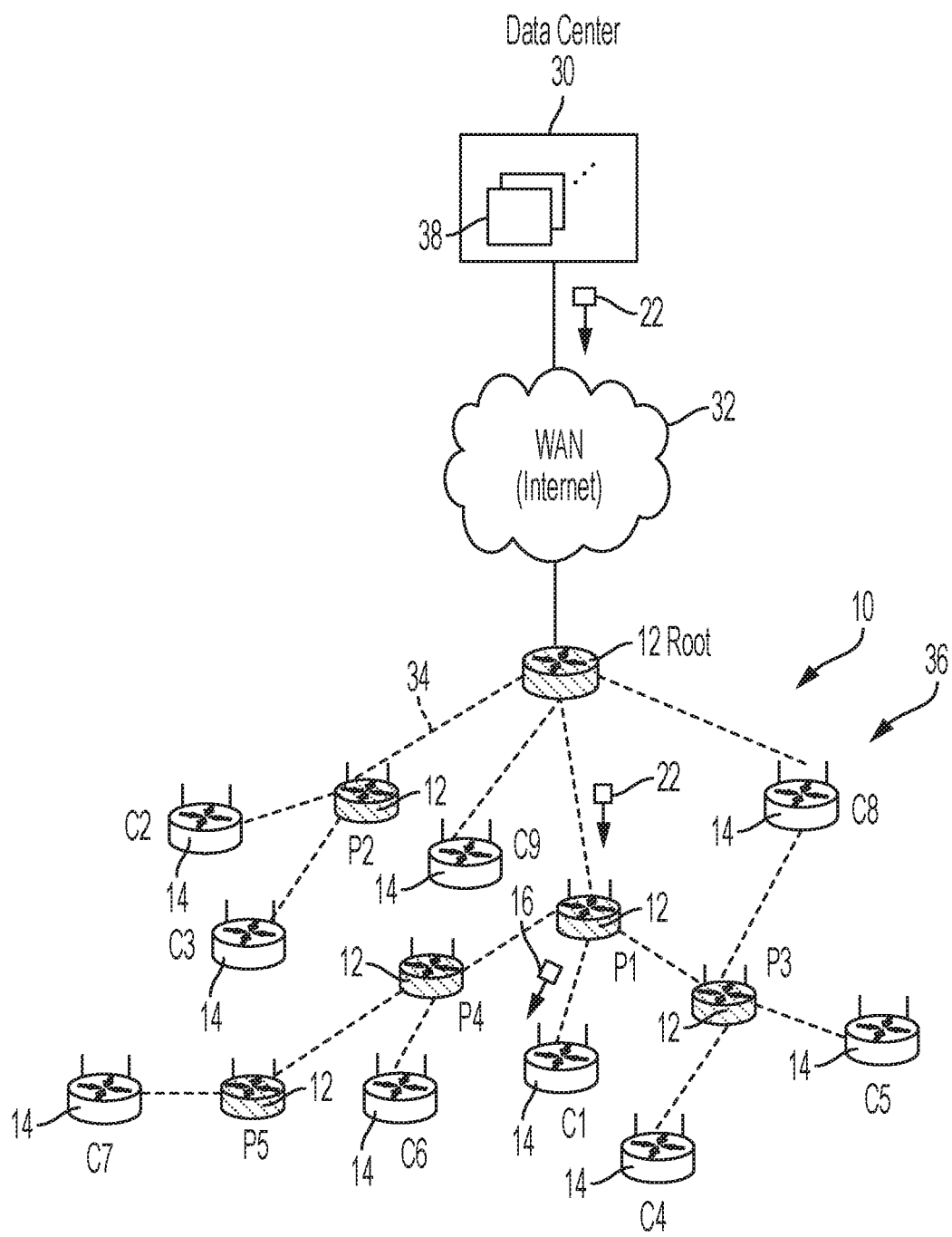
FIG. 1 illustrates an example low power and lossy network (LLN) having an apparatus for tracking an execution state and sleep state by an attached child LLN device, and transmitting to the attached child LLN device an instruction for an updated execution state in response to detecting the attached child LLN device has transitioned from a sleep state to an active state, according to an example embodiment.

In one embodiment, a method comprises: generating and storing, by a parent network device in a low power lossy network (LLN), first state variables associated with a first execution state of an attached child LLN device during an active state of the attached child LLN device; determining a request, received by the parent network device via the LLN, is destined for the attached child LLN device and specifying a second execution state to be executed by the attached child LLN device; selectively updating, by the parent network device, the first state variables with second state variables associated with the second execution state in response to determining the second execution state identifies an updated execution state for the attached child LLN device; detecting, by the parent network device, that the attached child LLN device has transitioned from a sleep state to a second active state, and in response generating an instruction based on the second state variables; and transmitting the instruction to the attached child LLN device during the second active state, causing the attached child LLN device to execute the second execution state.

In another embodiment, an apparatus is implemented as a machine and comprises: non-transitory machine readable media; a device interface circuit; and a processor circuit. The non-transitory machine readable media is configured for storing executable machine readable code. The device interface circuit is configured for receiving a request via low power and lossy network (LLN). The processor circuit configured for executing the machine readable code, and when executing the machine readable code operable for: generating and storing in the non-transitory machine readable media, by the apparatus implemented as a parent network device in the LLN, first state variables associated with a first execution state of an attached child LLN device during an active state of the attached child LLN device; determining the request is destined for the attached child LLN device and specifying a second execution state to be executed by the attached child LLN device; selectively updating, by the parent network device, the first state variables with second state variables associated with the second execution state in response to determining the second execution state identifies an updated execution state for the attached child LLN device; detecting, by the parent network device, that the attached child LLN device has transitioned from a sleep state to a second active state, and in response generating an instruction based on the second state variables; and transmitting the instruction to the attached child LLN device during the second active state, causing the attached child LLN device to execute the second execution state.

In another embodiment, one or more non-transitory tangible media encoded with logic for execution by a machine and when executed by the machine operable for: generating and storing, by the machine implemented as a parent network device in a low power lossy network (LLN), first state variables associated with a first execution state of an attached child LLN device during an active state of the attached child LLN device; determining a request, received by the parent network device via the LLN, is destined for the attached child LLN device and specifying a second execution state to be executed by the attached child LLN device; selectively updating the first state variables with second state variables associated with the second execution state in response to determining the second execution state identifies an updated execution state for the attached child LLN device; detecting that the attached child LLN device has transitioned from a sleep state to a second active state, and in response generating an instruction based on the second state variables; and transmitting the instruction to the attached child LLN device during the second active state, causing the attached child LLN device to execute the second execution state.

DETAILED DESCRIPTION

Particular embodiments optimize communications between a distant controller and constrained network devices (i.e., limited function devices (LFD)) in a low-power and lossy network (LLN), where the constrained network devices need to maintain substantially-long sleep states (i.e., low-power standby states) and relatively short active states to preserve constrained battery resources.

FIG. 1 illustrates an example low power and lossy network (LLN) 10 having an apparatus (e.g., mains-powered device "P1") 12 for tracking an execution state and sleep state by an attached constrained child LLN device (e.g., a constrained device "C1") 14, and transmitting to the attached constrained child LLN device "C1" 14 an instruction 16 for an updated execution state in response to detecting the attached child LLN device "C1" 14 has transitioned from a sleep state to an active state, according to an example embodiment.

The particular embodiments enable the apparatus (e.g., "P1") 12 (also referred to as a fully functioning device (FFD) or "fog node"), operating as a parent network device in the LLN 10 for a constrained child LLN device "C1" 14, to store identifiable state variables (18 of FIG. 2) associated with a corresponding execution state (20 of FIG. 2) that is executed during an active state of the constrained child LLN device "C1" 14 (i.e., the attached child LLN device): the execution state (e.g., 20a of FIG. 2) can be maintained by the attached constrained child LLN device "C1" 14 as the attached constrained child LLN device "C1" 14 transitions to a low-power sleep state to minimize power consumption. Hence, the parent network device "P1" 12 can determine, from the locally-stored identifiable state variables 18a, the last execution state 20a of the constrained child LLN device "C1" 14 as the constrained child LLN device "C1" 14 transitions from a higher-power active state to a lower-power sleep state.

The parent network device "P1" 12 also can receive, via the LLN 10, a request data packet 22 destined for the attached constrained child LLN device "C1" 14 and specifying an updated/requested execution state (24 of FIG. 2) to be executed by the attached constrained child LLN device "C1" 14: the parent network device "P1" 12 can respond to the request data packet 22 by selectively updating (operation 28 of FIG. 2) the locally-stored state variables 18a to updated locally-stored state variables 18b indicating the sleeping constrained child network device "C11" 14 needs to transition from the last execution state 20a to the updated/requested execution state 24, described in further detail below.

Hence, the parent network device "P1" 12, in response to detecting the attached constrained child LLN device "C1" 14 has transitioned from its sleep state to another active state, can generate and transmit an instruction 16 based on the updated locally-stored state variables 18b and that causes the attached constrained child LLN device "C1" 14 to transition from its current execution state 20a to the updated execution state 20b according to the requested execution state 24. The parent network device "P1" 12 can further update its locally-stored state variables 18c in response to receiving an acknowledgment (e.g., 26b of FIG. 2) that the attached constrained child LLN device "C1" 14 has transitioned to the updated execution state 20b.

Hence, the example embodiments enable the parent network device "P1" 12 to locally store state variables 18 of one or more execution states 20 of one or more attached constrained child network devices 14, effectively forming a "device shadow" 18 for each attached constrained child network device 14: the "device shadow" 18 enables the parent network device "P1" 12 to track existing execution states 20 and requested execution states 24, enabling the parent network device 12 to selectively send instructions 16 to the attached constrained child LLN device (e.g., "C1") 14 according to its corresponding schedule defining transitions between sleep states and active states. The example embodiments enable scalable deployment of updated execution instructions (implemented as one or more request data packets) 22 generated by a controller device (e.g., a centralized AMI controller device) 38 that can be deployed remotely (e.g., within a data center network 30 via a wide area network 32 such as the Internet), where the controller device 38 can generate and transmit the updated execution instructions 22 without the need for any awareness by the controller device 38 of the sleep schedules of the constrained network devices.

Hence, the example embodiments can minimize unnecessary retransmissions of updated execution instructions 22 by a controller device 38 in a data center network 30. The example embodiments also and can eliminate any need for transmitting any sleep schedule via the LLN 10 to the controller device 38 in the data center network 30.

The LLN 10 of FIG. 1 can be implemented as a wireless mesh data network, for example an IEEE 802.15.4e/g based low powered and lossy network (e.g., a CG-mesh network)

having a root mesh network device 12 implemented as a fully-functioning device and configured for operating as a destination-oriented directed acyclic graph (DODAG) root for multiple wireless mesh network devices (e.g., "P1" through "P5" 12 and "C1" through "C9" 14) via wireless data links 34, according to an example embodiment. The root network device 12 (and optionally any of the other fully-functioning devices "P1" through "P5" 12) can be implemented, for example, as a commercially-available Cisco® 1000 Series Connected Grid Router (CGR) from Cisco Systems, San Jose, Calif., modified as described herein. The root mesh network device 12 also can be referred to as a CGR 12, a DAG root 12, a DODAG root 12, a border router 12 or a root network device "CGR" 12. The root network device 12 can establish a DODAG 36 based on outputting multicast DODAG information object (DIO) messages 20, for example according to the Internet Engineering Task Force (IETF) Request for Comments (RFC) 6550.

All the network devices 12, 14 are configured for establishing wireless data links 34, even though only the wireless data link between the root network device 12 and the fully-functioning parent network device "P2" 12 is labeled with the reference numeral "34" to avoid cluttering in the Figures.

Each wireless network device (e.g., "P1" through "P5" 12 and "C1" through "C9" 14) in the wireless mesh data network 10 can join the DODAG 36 via wireless data links 34 in response to receiving a multicast DIO message (not shown). Each wireless mesh network device can configured for operating for example as a RPL node according to the Internet Engineering Task Force (IETF) Request for Comments (RFC) 6550. Hence, each wireless mesh network device can establish a DODAG topology 36 overlying the wireless mesh data network, described below, that is rooted at the root network device 12.

The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such devices executing the RPL protocol can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 34 between network devices 12, 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) 36 toward the root network device 12, where all routes in the LLN terminate at the root network device 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., "C1" through "C7" or beyond).

Each "child" network device (e.g., "P1", "P2", "C8", "C9") detecting the multicast DIO message output by the root network device 12 can select the root network device 12 as a parent in the identified DODAG 36 based on comparing network topology metrics (advertised in the multicast DIO message) to a prescribed objective function of the RPL instance. The "child" network device, upon attaching to its parent, can output its own updated multicast DIO message with updated network topology metrics (e.g., rank identifier) that enable other wireless mesh network devices to discover the DODAG 36, learn the updated network topology metrics, and select a DODAG parent. Hence, the network devices in the LLN 10 can join the DODAG 36 in response to receiving a multicast DIO message from an advertising DODAG parent device, and selecting the DODAG parent as a default route. Each advertising parent network device also can specify in its DIO message whether it is a fully-functioning device 12 or a limited function device 14; as illustrated in FIG. 1, the fully-functioning device "P3" can respond to the DIO message generated by the limited-functioning device "C8" 14 by selecting the limited-functioning device "C8" 14 only as an alternate parent if the preferred parent network device "P1" 12 is unavailable.

Downward routes (i.e., away from the DAG root) can be created based on unicast Destination Advertisement Object (DAO) messages that are created by a wireless mesh network device (e.g., "P1" through "P5" 12 and "C1" through "C9" 14) and unicast transmitted to the DAG root 12. In non-storing mode the RPL nodes do not store downward routing tables, hence a RPL node (e.g., "P1" through "P5" 12 and "C1" through "C9" 14) unicasts its DAO message to the DAG root 12, such that all data packets are sent to the DAG root and routed downward with source routes inserted by the DAG root 12.

Figure 3:
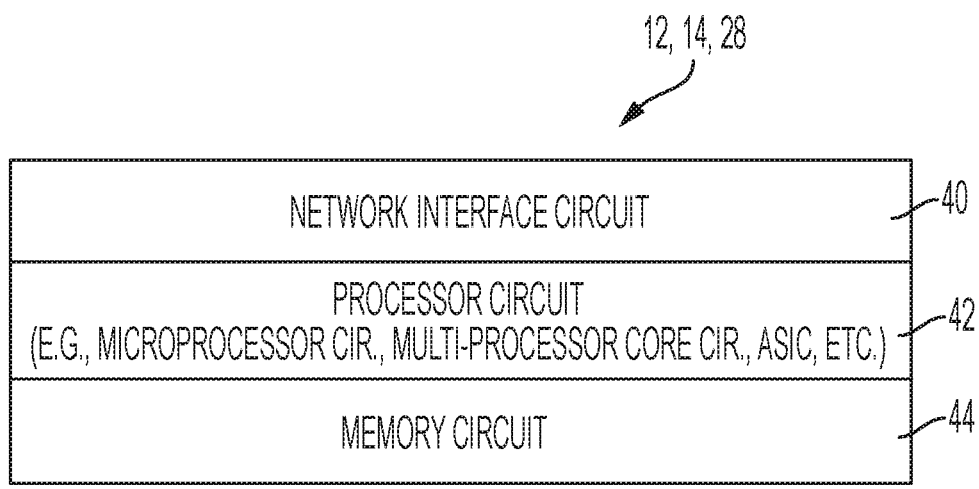
FIG. 3 illustrates an example implementation of any one of the devices of FIG. 1, according to an example embodiment.

The DAG root 12, in response to receiving the DAO messages from the RPL nodes (e.g., "P1" through "P5" 12 and "C1" through "C9" 14), can build the entire nonstoring DODAG topology 18 in accordance with RFC 6550, and store the DAG topology in its memory circuit (44 of FIG. 3).

As described in further detail below, the wireless mesh data network 10 can include wireless network devices (e.g., "P1" through "P5") having sufficient processing capacity as "fog nodes" (e.g., power, memory, processor capacity) and can be implemented, for example, using commercially-available Cisco 500 Series WPAN Industrial Routers from Cisco Systems, modified as described herein.

Although the LLN 10 is illustrated as a DODAG 36 having a root network device and multiple-hop paths for reaching leaf network devices (e.g., "C1" through "C7"), the LLN 10 also can be implemented as a Wi-SUN based network having a star topology or cluster topology. Also note any one of the fully-functioning devices 12 such as the root network device, or any of the LLN devices "P1", "P2", "P3", "P4", and/or "P5" can execute any of the disclosed operations on behalf of one or more attached limited function devices 14 (e.g., the "root" fully-functioning device 12 can execute the disclosed operations on behalf of the attached child devices "C8" and "C9").

FIG. 3 illustrates an example implementation of any one of the devices 12, 14, 38 of FIG. 1, according to an example embodiment. Any differences between the devices 12, 14, and/or 38 can be with respect to resource capacity in implementation (e.g., fully-functioning mains-powered or limited function battery-powered). Each apparatus 12, 14, 38 is a physical machine (i.e., a hardware device) configured for implementing network communications with other physical machines via the network 10, 30, and/or 32. The term "configured for" or "configured to" as used herein with respect to a specified operation refers to a device and/or machine that is physically constructed and arranged to perform the specified operation.

Each apparatus 12, 14, and/or 38 can include a device interface circuit 40, a processor circuit 42, and a memory circuit 44. The device interface circuit 40 can include one or more distinct physical layer transceivers for communication with any one of the other devices 12, 14, and/or 38; the device interface circuit 40 also can include an IEEE based Ethernet transceiver for communications with the devices of FIG. 1 via any type of data link, as appropriate (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 14, and/or 38 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
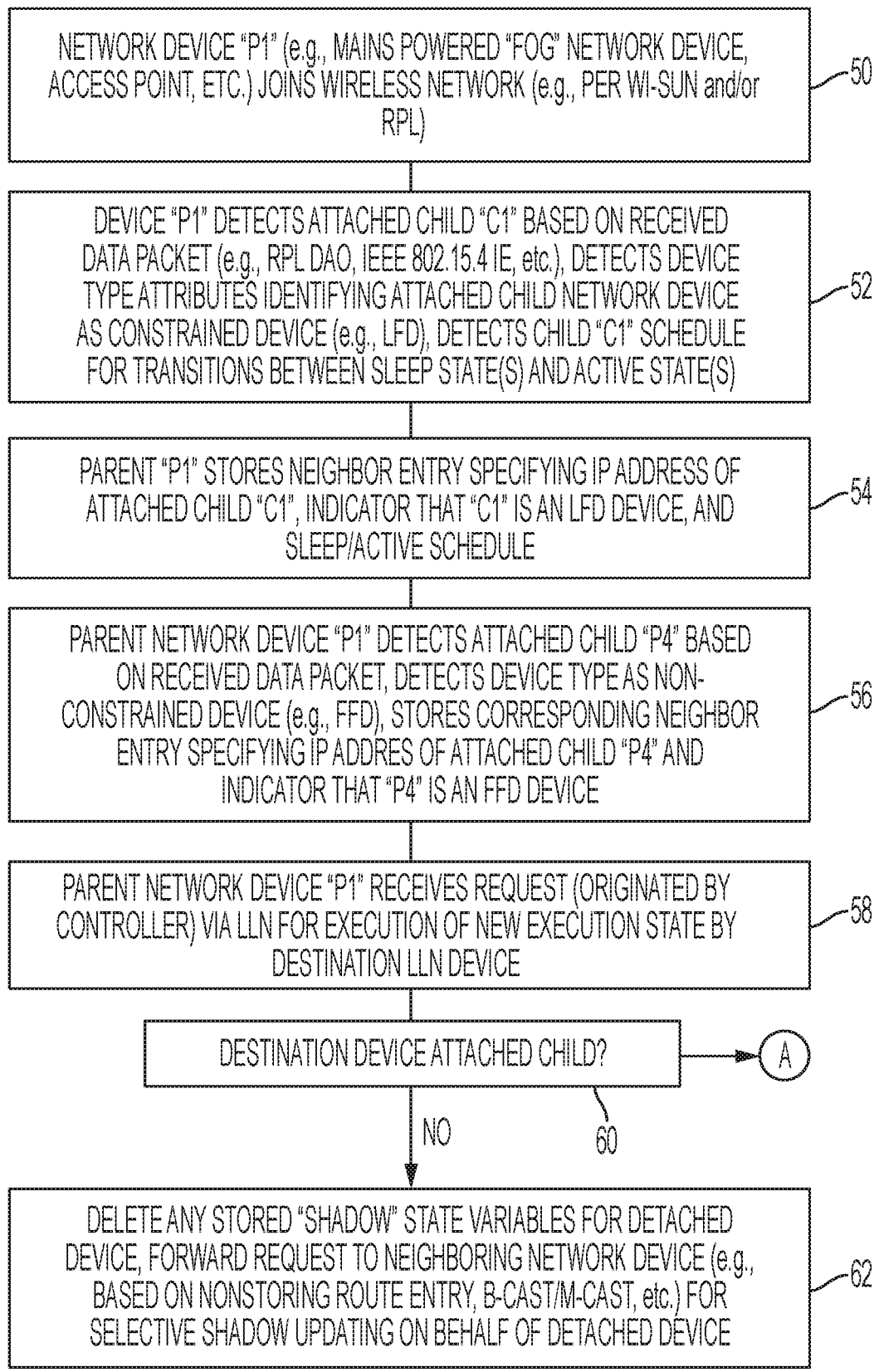
FIGS. 4A and 4B illustrate an example method of the apparatus of FIG. 1 for tracking an execution state and sleep state by an attached child LLN device, and transmitting to the attached child LLN device an instruction upon a detected transition to an active state, according to an example embodiment.
Figure 4B:
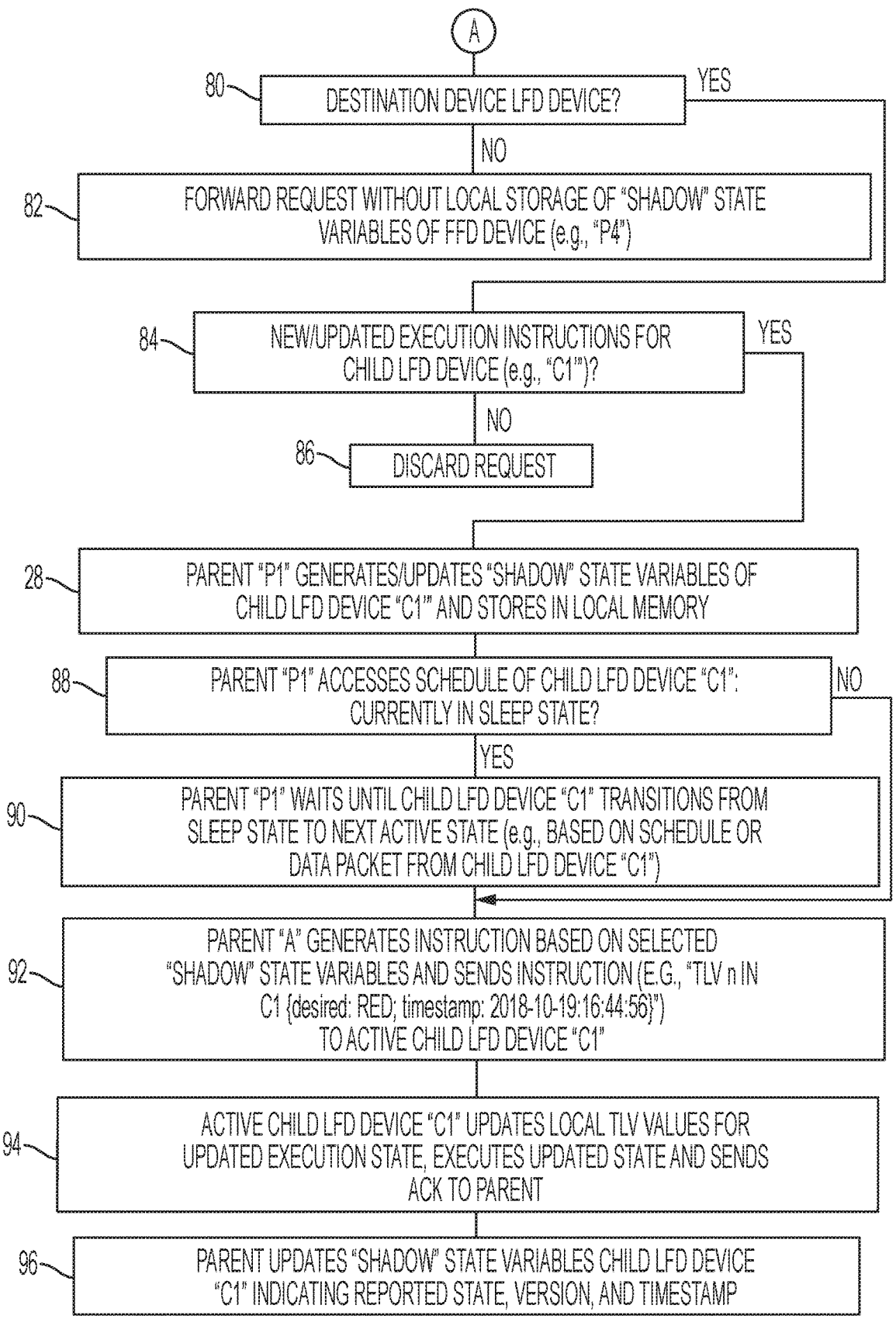

FIGS. 4A and 4B illustrate an example method of an apparatus (e.g., the parent network device "P1" 12) tracking an execution state and sleep state by an attached child LLN device (e.g., the attached constrained child LLN device "C1" 14), and transmitting to the attached child LLN device an instruction 16 upon a detected transition to an active state, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to operation 50, the processor circuit 42 of the parent network device "P1" 12 is configured for joining the LLN 10, for example joining the DODAG 36 according to RFC 6550, Wi-SUN, and/or 6LoWPAN, etc. Depending on implementation, the processor circuit 42 of the parent network device "P1" 12 also can cause its corresponding device interface circuit 40 to output an updated advertisement message (e.g., DIO message advertising the DODAG 36 and/or an IEEE based Information Element (IE)) advertising the LLN 10, enabling neighboring wireless network devices (e.g., "P3", "P4", "C1") to attach to the parent network device "P1" 12 in response to detecting the advertisement message.

The processor circuit 42 of the parent network device "P1" 12 in operation 52 can detect the attached constrained child LLN device "C1" 14 joining as an attached child in response to a received data packet (e.g., 26a of FIG. 2) operable as a response to the advertisement message (e.g., a RPL DAO message, an IEEE 802.15.4 IE, etc.), and in response the processor circuit 42 of the parent network device "P1" 12 in operation 54 can store in its memory circuit 44 a neighbor entry within its neighbor table, where the neighbor entry for the attached constrained child LLN device "C1" 14 can specify the Internet Protocol v6 (IPv6) address of the attached constrained child LLN device "C1" 14. In one embodiment, each acknowledgment 26 (e.g., 26a, 26b) can be implemented as a Constrained Application Protocol (CoAP) Simple Management Protocol (CSMP) message that provides one or more Type-Length-Value (TLV) values that can be communicated by the attached constrained child LLN device "C1" 14 to the parent network device "P1" 12. Each fully-functioning device 12 can be configured as a CoAP server and each limited function device 14 can be configured as a CoAP client.

The processor circuit 42 of the parent network device "P1" 12 in operation 52 also can detect that the received data packet (e.g., 26a of FIG. 2) (or another data packet from the attached constrained child LLN device "C1" 14) also can specify one or more device type attributes as one or more Type-Length-Value entries, for example indicating that the attached constrained child LLN device "C1" 14 is a constrained device (e.g., an LFD) (as opposed to a non-constrained device or "FFD"); hence, the processor circuit 42 of the parent network device "P1" 12 in operation 54 also can specify in the corresponding neighbor entry that the attached constrained child LLN device "C1" 14 is an LFD device. In one example, the device type attributes specified in the received data packet (e.g., 26a of FIG. 2) can be implemented as a new IEEE 802.15.4 based Information Element (IE) that identifies a network device by vendor/model number, "FFD/LFD" type, "battery/mains" power source type, etc.

The processor circuit 42 of the parent network device "P1" 12 in operation 52 also can detect that the received data packet (e.g., 26a of FIG. 2) (or another data packet from the attached constrained child LLN device "C1" 14) also can detect a schedule identifying when the attached constrained child LLN device "C1" 14 transitions from a sleep state to its next active state (e.g., based on a chronological time-based schedule and/or a time interval-based schedule); hence, the processor circuit 42 of the parent network device "P1" 12 in operation 54 also can specify in the corresponding neighbor entry the corresponding sleep schedule for attached constrained child LLN device "C1" 14, enabling the processor circuit 42 of the parent network device "P1" 12 to determine the next active state for the attached constrained child LLN device "C1" 14 based on accessing the corresponding schedule from the neighbor entry.

Figure 2:
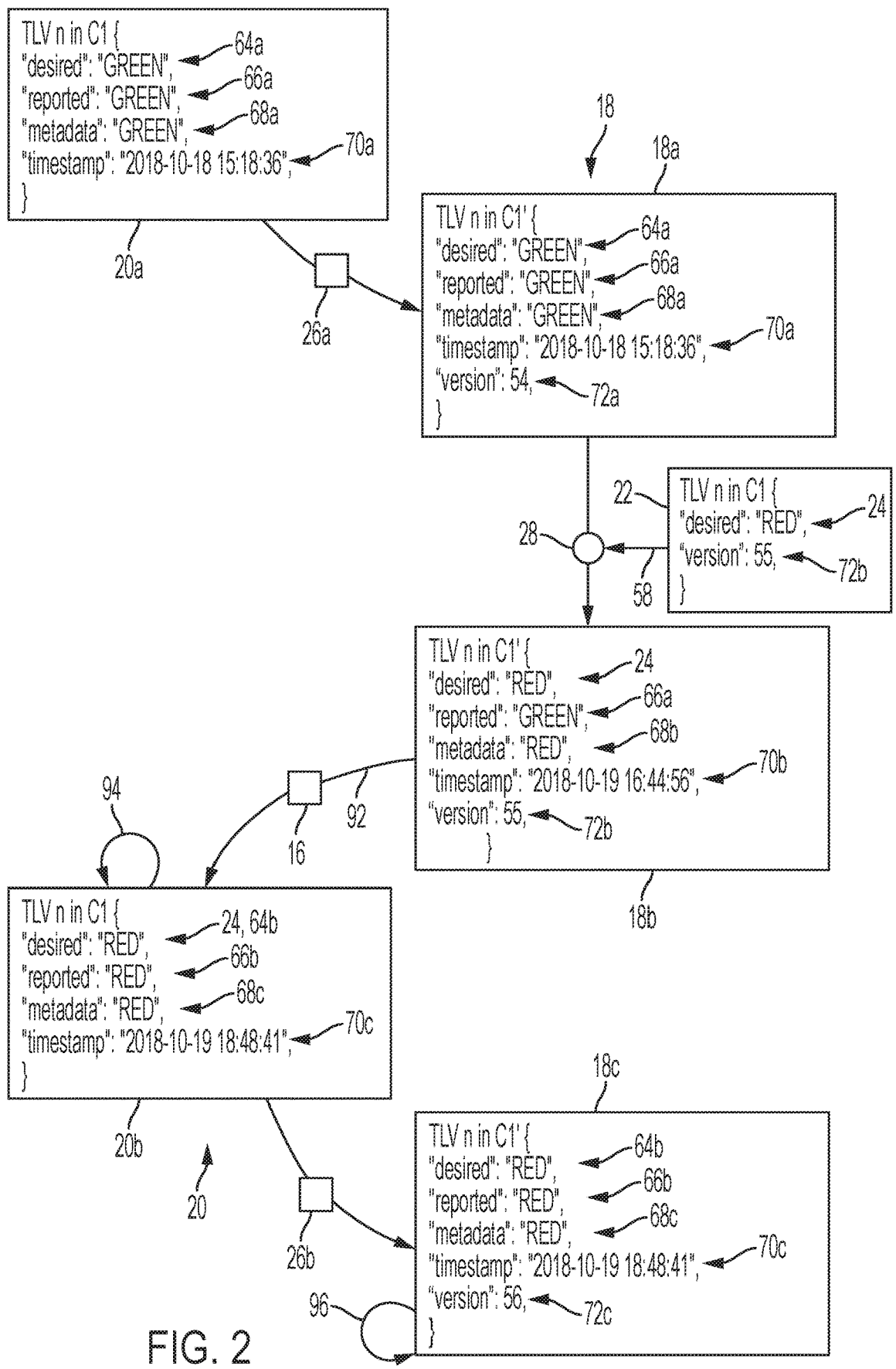
FIG. 2 illustrate example data structures in the apparatus and the attached child LLN device for tracking and updating execution states in the attached child LLN device, according to an example embodiment.

Although not shown in FIG. 4A, the attached constrained child LLN device "C1" 14 also can transmit within its data packet (e.g., 26a or another data packet) its current execution state 20a, enabling the processor circuit 42 of the parent network device "P1" 12 to create a new data structure 18a of locally-stored identifiable state variables for the attached constrained child LLN device "C1" 14, illustrated in FIG. 2. Each network device 12, 14, can store its associated variables 18, 20 as JavaScript Object Notation (JSON) based TLV variables.

As illustrated in FIG. 2, the attached constrained child LLN device "C1" 14 can store its current execution state 20a for an identified interface "n" (e.g., a prescribed LED interface), comprising a "desired" state 64a (identifying the most recently-received requested execution state 24 from another device, or default if none previously received), a "reported" state 66a (identifying the most recently-reported execution state currently executed by the attached constrained child LLN device "C1" 14 during its current active state), a "metadata" state 68a identifying the latest logical state of the attached constrained child LLN device "C1" 14, described below, and a timestamp value 70a identifying the update time of the corresponding execution state 20a (e.g., on the example date "2018-10-18" at the example time "15:18:36" UTC). Hence, processor circuit 42 of the parent network device "P1" 12 can copy the initial attributes 64a, 66a, 68a, 70a for a "shadow" device "C1'" that is a virtualization of the execution state 20a in the attached constrained child LLN device "C1" 14, and generate (or increment) a corresponding version counter 72a, indicating that the attached constrained child LLN device "C1" 14 has executed illuminating its LED interface "n" with the color "GREEN".

The processor circuit 42 of the parent network device "P1" 12 in operation 56 can detect the fully-functioning device "P3" (and/or "P4") 12 joining as an attached child in response to a received data packet operable as a response to the advertisement message (e.g., a RPL DAO message, an IEEE 802.15.4 IE, etc.), and in response the processor circuit 42 of the parent network device "P1" 12 in operation 54 can store in its neighbor table in the memory circuit 44 a corresponding neighbor entry for the fully-functioning device "P3" (and/or "P4") 12 specifying the corresponding IPv6 address of the attached child "P3" (and/or "P4") 12.

The processor circuit 42 of the parent network device "P1" 12 in operation 56 also can detect that the received data packet (or another data packet from the device "P3" and/or "P4" 12) also can specify one or more device type attributes indicating that the device "P3" and/or "P4" 12 is a fully-functioning device (e.g., mains-powered and therefore does not utilize a sleep state but maintains an active state); hence, the processor circuit 42 of the parent network device "P1" 12 in operation 56 also can specify in the corresponding neighbor entry that the device "P3" and/or "P4" 12 is a fully-functioning device. As described previously, the parent network device "P1" 12 can generate and/or any DAO messages toward the root network device 12 to enable the root network device 12 to reach any of the child network devices (e.g., "P3", "P4", and/or "C1") via the parent network device "P1" 12.

Following registration of one or more child network devices (including the attached constrained child LLN device "C1" 14), the device interface circuit 40 of the parent network device "P1" 12 in operation 58 can receive a request data packet 22 that is originated by the controller device 38 in the data center network 30 and transmitted to the parent network device "P1" 12 via the wide area network (WAN) 32 and the LLN 10 (e.g., via the root network device 12). The processor circuit 42 of the parent network device "P1" 12 can determine in operation 58 that the request data packet 22 is destined for the attached constrained child LLN device "C1" 14, based on determining the request data packet 22 specifying the requested execution state "RED" 24 for the interface "n" in the attached constrained child LLN device "C1" 14 (and/or any associated routing headers and/or destination address field in the received request data packet 22).

The request data packet 22 can be received in operation 58 asynchronously relative to the state of the destination attached constrained child LLN device "C1" 14; hence, it is possible that following the generation of the identifiable state variables 18a after operation 54, the constrained child LLN device "C1" 14 could disconnect from the parent network device "P1" 12 and attach to an alternate parent (e.g., "P3" of FIG. 1).

Hence, the processor circuit 42 of the parent network device "P1" 12 in operation 60 can determine if the destination device "C1" is still an attached child of the parent network device "P1" 12 or whether the destination device "C1" has detached, for example based on determining an absence of any communications with the destination device "C1" 14 at the next active state (as determined from the stored schedule). If in operation 60 the processor circuit 42 of the parent network device "P1" 12 determines the destination device "C1" of the request data packet 22 has detached and is no longer an attached child device, the processor circuit 42 of the parent network device "P1" 12 in operation 62 can delete any stored shadow state variables 18 from its memory circuit 44; the processor circuit 42 of the parent network device "P1" 12 also can forward the request data packet 22 to a neighboring network device, for example based on a nonstoring route entry according to RFC 6550, a source-route header in the received data packet 22, a broadcast or multicast forwarding to a neighboring fully-functioning device 12, etc. Hence, the forwarding of the request data packet 22 in operation 62 can cause an alternate parent (e.g., "P3") 12 to detect the request data packet 22 destined for its new child network device "C1" 14, and can cause the alternate parent (e.g., "P3") 12 to execute selective updating of the associated state variables 18 in its corresponding local memory circuit 44, as described below with reference to operation 28 of FIGS. 2 and 4B.

If in operation 60 the processor circuit 42 of the parent network device "P1" 12 determines the destination device (e.g., "C1", "P3", or "P4") of the received request data packet 22 is still an attached child, the processor circuit 42 of the parent network device "P1" 12 in operation 80 of FIG. 4B can determine, from the stored device type in the corresponding stored neighbor entry (stored in operation 54 or 56) whether the destination device is a constrained "LFD" device 14 or a fully-functioning FFD device 12. In response to the processor circuit 42 of the parent network device "P1" 12 determining the destination child device is a fully-functioning device 12, the processor circuit 42 of the parent network device "P1" 12 in operation 82 can cause the device interface circuit 40 to forward the received request data packet 22 to the destination FFD (e.g., "P3" or "P4") for immediate execution of the requested execution state "RED" 24 specified in the request data packet 22. The processor circuit 42 of the parent network device "P1" 12 in operation 82 can forward the request data packet 22 to the destination child fully-functioning device 12 without any local storage of any "shadow" state 18, since the destination child fully-functioning device 12 is always in an active state (i.e., never in a sleep state) and therefore can immediately execute the requested execution state "RED" 24.

If, however, the processor circuit 42 of the parent network device "P1" 12 in operation 80 determines from the stored device type in the corresponding stored neighbor entry that the destination device of the received request data packet 22 is a limited function device (e.g., "C1") 14, the processor circuit 42 of the parent network device "P1" 12 can determine in operation 84 whether the requested execution state "RED" 24 represents a new or updated instruction, for example based on comparing the corresponding version counter 72 specified in the request data packet 22 with the existing version counter 72a stored in the identifiable state variables 18a. If the processor circuit 42 of the parent network device "P1" 12 in operation 84 determines the request data packet 22 specifies an existing or older version counter 72 relative to the stored version counter 72a, the processor circuit 42 of the parent network device "P1" 12 in operation 86 can discard the received request data packet 22 as stale.

If, however, the processor circuit 42 of the parent network device "P1" 12 in operation 84 determines that the request data packet 22 specifies a new or updated version counter (e.g., "version=55") 72b relative to the stored version counter (e.g., "version=54") 72a, the processor circuit 42 of the parent network device "P1" 12 in operation 28 of FIGS. 2 and 4B can generate and/or update the stored identifiable state variables 18a to the updated shadow state variables 18b stored in the memory circuit 44 of the parent network device "P1" 12. As illustrated in FIG. 2, the updated identifiable state variables 18b specifies the requested execution state "RED" 24, the "reported" state "GREEN" 66a that is the current execution state of the corresponding interface "n" in the attached constrained child LLN device "C1" 14, the updated "metadata" state 68b representing the updated "logical" state of the virtualized child network device "C1'", the updated timestamp value 70b set by the parent network device "P1" 12 in operation 28, and the version counter 72b. Hence, the processor circuit 42 of the parent network device "P1" 12 can determine from the locally-stored identifiable state variables 18b that the execution state of the attached constrained child LLN device "C1" 14 needs to be updated to the requested execution state "RED" 24 as specified by the version counter "55" 72b.

The processor circuit 42 of the parent network device "P1" 12 in operation 88 can retrieve the corresponding schedule for the attached constrained child LLN device "C1" 14 from the locally-stored neighbor entry (stored in operation 54) and determine whether the destination attached constrained child LLN device "C1" 14 is currently in a sleep state, or whether the destination attached constrained child LLN device "C1" 14 is currently in an active state. In response to the processor circuit 42 of the parent network device "P1" 12 determining the destination attached constrained child LLN device "C1" 14 is currently in a sleep state, the processor circuit 42 of the parent network device "P1" 12 can wait in operation 90, based on the retrieved schedule, for the destination attached constrained child LLN device "C1" 14 to transition from its sleep state to its next active state, before generating in operation 92 an instruction 16 for the destination attached constrained child LLN device "C1" 14 to change its execution state.

The processor circuit 42 of the parent network device "P1" 12 in operation 92 can generate the instruction 16 based on inserting selected "shadow" state variables from the identifiable state variables 18b into the instruction 16, including for example at least the requested execution state "RED" 24 and the timestamp value "2018-10-19 16:44:56" 70b; the processor circuit 42 of the parent network device "P1" 12 also can add more or all of the variables of the identifiable state variables 18b into the instruction 16. The processor circuit 42 of the parent network device "P1" 12 in operation 92 causes the device interface circuit 40 to transmit the instruction 16 during the active state of the attached constrained child LLN device "C1" 14, enabling the attached constrained child LLN device "C1" 14 to respond to reception of the instruction 16 in operation 94.

The processor circuit 42 of the attached constrained child LLN device "C1" 14 in operation 94 can determine the updated requested execution state "RED" 24 (e.g., based on the timestamp value 70b having a more recent value than the corresponding timestamp value 70a stored in its execution state 20a), and in response update its execution state 20 to the updated execution state 20b that includes the requested execution state "RED" 24 as its "desired" state 64b, the "reported" state "RED" 66b, the "metadata" state "RED" 68c, and an updated timestamp value "2018-10-19 18:48:41" 70c generated by the "C1 in operation 94. The processor circuit 42 of the attached constrained child LLN device "C1" 14 in operation 94 can begin execution of the updated execution state 20b by changing the illumination state of the LED at interface "n" from "GREEN" (as specified in the execution state 20a) to "RED" (as specified in the updated execution state 20b), consistent with the requested execution state "RED" 24 that was generated and sent by the controller device 38, possibly while the attached constrained child LLN device "C1" 14 was in a sleep state.

The processor circuit 42 of the attached constrained child LLN device "C1" 14 in operation 94 can generate and output an acknowledgment 26b (comprising, for example the "reported" state 66b, the "metadata" state 68c, and the timestamp value 70c), causing the processor circuit 42 of the parent network device "P1" 12 in operation 96 to update its identifiable state variables 18b to the identifiable state variables 18c that indicates the updated "reported" state 66b, the updated "metadata" state 68c associated with the updated timestamp value 70c, and an updated version counter "version=56" 72c. The foregoing description can be repeated for each request data packet 22 generated by the controller device 38 and received by the parent network device "P1" 12 via the LLN 10.

According to example embodiments, a "fog" network device deployed in a low power and lossy network can provide a logical synchronization between a remotely-located controller device that issues execution state commands, and a destination constrained child LLN device that is attached to the "fog" network device: the logical synchronization can be stored locally in the "fog" network device while the destination constrained child LLN device is in a low-power sleep state; the "fog" network device can locally determine a time instance that the destination constrained child LLN device transitions from its sleep state to its next active state, causing the "fog" network device to generate and send to the active destination constrained child LLN device an instruction for execution of the state command by the active destination constrained child LLN device. The example embodiments optimize the logical synchronization by a "fog" network device between the reception of the request data packet 22 and the sleep/active schedule of the destination constrained child LLN device, minimizing waste of wireless bandwidth due to unsuccessful deployments of the request data packet 22, thereby providing improved wireless network stability in the LLN 10.

Various wireless-based protocols can be used in the example embodiments, including but not limited to CoAP, MQTT, or other Internet of Things (IoT) based protocols.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
generating and storing, by a parent network device in a low power lossy network (LLN), first state variables associated with a first execution state of an attached child LLN device during an active state of the attached child LLN device, the generating and storing based on the parent network device determining that the attached child LLN device is a constrained device;
determining a request, received by the parent network device via the LLN, is destined for the attached child LLN device and specifying a second execution state to be executed by the attached child LLN device;
selectively updating, by the parent network device, the first state variables with second state variables associated with the second execution state in response to determining the second execution state identifies an updated execution state for the attached child LLN device;
detecting, by the parent network device, that the attached child LLN device has transitioned from a sleep state to a second active state, and in response generating an instruction based on the second state variables; and
transmitting the instruction to the attached child LLN device during the second active state, causing the attached child LLN device to execute the second execution state.

2. The method of claim 1, wherein the second state variables include a pending transition to the second execution state while the attached child LLN device is in the sleep state.

3. The method of claim 1, wherein the generating of the first state variables is based on receiving, from the attached child LLN device during the active state, a data packet acknowledging the first execution state.

4. The method of claim 1, further comprising receiving, from the attached child LLN device, a data packet specifying a device type as one of the constrained device or a non-constrained device.

5. The method of claim 4, further comprising:
receiving, from a second attached child LLN device, a corresponding data packet specifying the corresponding device type as a non-constrained device;
storing, in a neighbor table of the parent network device, a first entry that the attached child LLN device is a constrained device and a second entry that the second attached child LLN device is a non-constrained device;
receiving, by the parent network device, a second request destined for the second attached child LLN device; and
forwarding the second request to the second attached child LLN device, without storing any corresponding state variables associated with the second attached child LLN device, based on the second attached child LLN device identified as a non-constrained device.

6. The method of claim 1, wherein the first state variables and second state variables are stored in the parent network device as type-length-value entries, the generating including inserting selected type-length-value entries from the second state variables into the instruction for transmission according to a constrained application protocol.

7. The method of claim 1, further comprising receiving, from the attached child LLN device before the sleep state, a schedule identifying when the attached child LLN device transitions from the sleep state to the second active state, the detecting based on the parent network device accessing the schedule for the attached child LLN device.

8. The method of claim 1, further comprising:
deleting any state variables associated with the attached child LLN device in response to detecting the attached LLN device detaching from the parent network device as a detached LLN device;
receiving a second request for the detached LLN device; and
forwarding the second request to a neighboring network device for selective updating of associated state variables for the detached LLN device by the neighboring network device.

9. An apparatus implemented as a physical machine, the apparatus comprising:
non-transitory machine readable media configured for storing executable machine readable code;
a device interface circuit configured for receiving a request via a low power and lossy network (LLN); and
a processor circuit configured for executing the machine readable code, and when executing the machine readable code operable for:
generating and storing in the non-transitory machine readable media, by the apparatus implemented as a parent network device in the LLN, first state variables associated with a first execution state of an attached child LLN device during an active state of the attached child LLN device, the generating and storing based on the apparatus determining that the attached child LLN device is a constrained device;

determining the request is destined for the attached child LLN device and specifying a second execution state to be executed by the attached child LLN device;

selectively updating, by the parent network device, the first state variables with second state variables associated with the second execution state in response to determining the second execution state identifies an updated execution state for the attached child LLN device;

detecting, by the parent network device, that the attached child LLN device has transitioned from a sleep state to a second active state, and in response generating an instruction based on the second state variables; and transmitting the instruction to the attached child LLN device during the second active state, causing the attached child LLN device to execute the second execution state.

10. The apparatus of claim 9, wherein the second state variables include a pending transition to the second execution state while the attached child LLN device is in the sleep state.

11. The apparatus of claim 9, wherein the processor circuit is configured for generating the first state variables in response to receiving, from the attached child LLN device during the active state, a data packet acknowledging the first execution state.

12. The apparatus of claim 9, wherein the device interface circuit is configured for receiving, from the attached child LLN device, a data packet specifying a device type as one of the constrained device or a non-constrained device.

13. The apparatus of claim 12, wherein:
the device interface circuit is configured for receiving, from a second attached child LLN device, a corresponding data packet specifying the corresponding device type as a non-constrained device;
the processor circuit is configured for storing in the non-transitory machine readable media, a first entry in a neighbor table and indicating that the attached child LLN device is a constrained device and a second entry that the second attached child LLN device is a non-constrained device;
the device interface circuit is configured for receiving a second request destined for the second attached child LLN device; and
the processor circuit is configured for causing the device interface circuit to forward the second request to the second attached child LLN device, without storage of any corresponding state variables associated with the second attached child LLN device, based on the processor circuit identifying the second attached child LLN device as a non-constrained device.

14. The apparatus of claim 9, wherein the processor circuit is configured for storing the first state variables and second state variables as type-length-value entries, the processor circuit configured for inserting selected type-length-value entries from the second state variables into the instruction for transmission according to a constrained application protocol.

15. The apparatus of claim 9, wherein:
the device interface circuit is configured for receiving, from the attached child LLN device before the sleep state, a schedule identifying when the attached child LLN device transitions from the sleep state to the second active state;
the processor circuit configured for detecting that the attached child LLN device has transitioned from the sleep state to the second active state based on accessing the schedule for the attached child LLN device.

16. The apparatus of claim 9, wherein:
the processor circuit is configured for deleting any state variables associated with the attached child LLN device in response to detecting the attached LLN device detaching from the parent network device as a detached LLN device;
the device interface circuit is configured for receiving a second request for the detached LLN device; and
the processor circuit is configured for causing the device interface circuit to forward the second request to a neighboring network device for selective updating of associated state variables for the detached LLN device by the neighboring network device.

17. One or more non-transitory tangible media encoded with logic for execution by a machine and when executed by the machine operable for:
generating and storing, by the machine implemented as a parent network device in a low power lossy network (LLN), first state variables associated with a first execution state of an attached child LLN device during an active state of the attached child LLN device, the generating and storing based on the parent network device determining that the attached child LLN device is a constrained device;
determining a request, received by the parent network device via the LLN, is destined for the attached child LLN device and specifying a second execution state to be executed by the attached child LLN device;
selectively updating the first state variables with second state variables associated with the second execution state in response to determining the second execution state identifies an updated execution state for the attached child LLN device;
detecting that the attached child LLN device has transitioned from a sleep state to a second active state, and in response generating an instruction based on the second state variables; and
transmitting the instruction to the attached child LLN device during the second active state, causing the attached child LLN device to execute the second execution state.

18. The one or more non-transitory tangible media of claim 17, further operable for receiving, from the attached child LLN device, a data packet specifying a device type as one of the constrained device or a non-constrained device.

19. The one or more non-transitory tangible media of claim 17, further operable for receiving, from the attached child LLN device before the sleep state, a schedule identifying when the attached child LLN device transitions from the sleep state to the second active state, the detecting based on the accessing the schedule for the attached child LLN device.

20. The one or more non-transitory tangible media of claim 17, further operable for:
deleting any state variables associated with the attached child LLN device in response to detecting the attached LLN device detaching from the parent network device as a detached LLN device;
receiving a second request for the detached LLN device; and forwarding the second request to a neighboring network device for selective updating of associated state variables for the detached LLN device by the neighboring network device.

* * * * *